July 24, 1962   R. H. SEVERANCE ET AL   3,045,509
METHOD OF MANUFACTURE OF A FILE
Filed Jan. 18, 1954
FIG-1-
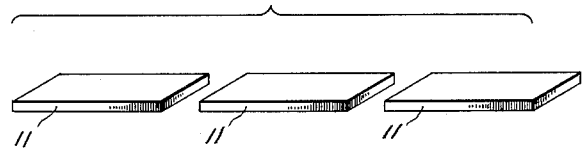
FIG-2-
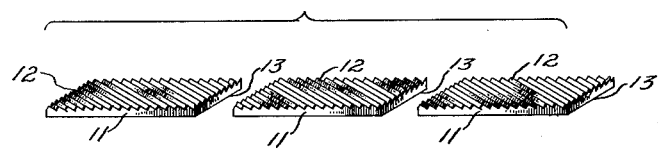
FIG-3-
FIG-4-
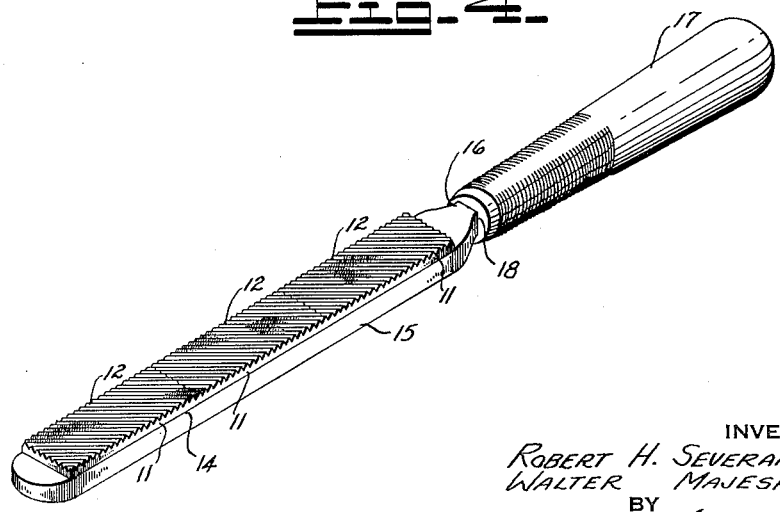
INVENTORS
ROBERT H. SEVERANCE
WALTER MAJESKE
BY
Laurence Vanderkelen & Miller
ATTORNEYS United States Patent Office 3,045,509
Patented July 24, 1962

3,045,509
METHOD OF MANUFACTURE OF A FILE
Robert H. Severance and Walter Majeske, Saginaw, Mich., assignors to Severance Tool Industries, Inc., Saginaw, Mich., a corporation of Michigan
Filed Jan. 18, 1954, Ser. No. 404,664
1 Claim. (Cl. 76—24)

The present invention relates to carbide files and a method for accomplishing their manufacture. More particularly the invention relates to a file having cutting teeth of tungsten carbide which lengthwise comprises a joined plurality of rectangular segments in such a manner that the alignment of teeth is not disturbed and the tooth level is maintained constant throughout the length of the file.

For many years since the advent of tungsten carbide as a material for metal working tools a tungsten carbide file has been sought after in order to incorporate in a file the desirable cutting features of tungsten carbide. Whatever structure was devised required that mounting means be simple but that whatever mounting means were to be employed must cushion the brittle tungsten carbide face against shock. Almost universally brazing was adopted as a method for attaching tips to tool holders. The brazing heat would not damage the tungsten carbide and a secure hold upon the tungsten carbide tip bonding it to the metal tool holder was accomplished. Further, the pieces of tungsten carbide were relatively small. A full file, while admitted as desirable, would have required a piece of carbide out of all relation to the standardized pieces which were prepared for tool usage. Attempts were made to produce files of tungsten carbide. Segmenting of the tungsten carbide was necessary immediately not only because of the practical sizes of the tungsten carbide pieces, but because of the variance in the coefficients of expansion in the materials to which it was affixed. Segmental pieces were ground to a file surface, then matched and subsequently brazed to a metal base. Because of the heat required by brazing and because of the variance between the coefficients of expansion in the backing material and the tungsten carbide a satisfactory tungsten carbide file was impossible to produce. When brazing was employed, surface irregularities appeared along with "cocking" of the segments as they were attached to the metal base material. Part of the difficulty lay in the inconsistent thicknesses of the tungsten carbide blocks. Expensive jigs and grinding mechanisms avoided the thickness variations only to find that in the actual brazing operation new misalignments of the file faces were encountered.

It is one of the objects of the present invention to produce a file which overcomes the criticism of prior attempts at producing tungsten carbide files and which makes available to industry a file having enhanced characteristics and a segmental tungsten carbide working face.

It is another of the objects of this invention to present a file which can be economically manufactured and easily adaptable to regrind.

Still another object is to teach a method for producing tungsten carbide files which is simple and economical.

A still further object is to demonstrate a method of producing tungsten carbide files wherein misalignment between the tungsten carbide segmented working faces is eliminated and where the tooth segments may be simply stripped from the backing material for replacement or reconditioning.

In the drawing:
FIGURE 1 is a perspective view of three tungsten carbide blocks before grinding.
FIGURE 2 is a perspective view of the same three tungsten carbide blocks after grinding.
FIGURE 3 is a side elevational view showing the three tungsten carbide blocks resting on a flat surface with mastic material spread upon the side opposite the cutting surface of the blocks and indicates a poised file back similarly coated with mastic material preparatory to being forced into the first-mentioned mastic material.
FIGURE 4 is a perspective sketch of a completed file with a handle attached.

Referring more particularly to the drawing a plurality of uniformly dimensioned tungsten carbide blocks 11 are shown. Teeth 12 are roughly ground into the desired surfaces of the soft carbide blocks 11. In the drawing teeth 12 are shown on one face only of the blocks 11 but it is understood that the edges may also be prepared with file faces as desired with no departure from the spirit of this invention.

The rough ground soft tungsten carbide blocks 11 are subsequently sintered under standard sintering heat and the tungsten carbide blocks 11 thus prepared are hardened. In the sintering operation some shrinkage occurs in the blocks 11 and the rough grind operation assures that the shrinkage in the rough ground teeth will assist in the finishing by minimizing the amount of carbide stock which must be removed in the finishing operation. The flat faces 13 opposite the file faces 12 are sanded, normally on a conventional belt sander, to remove sinter scale and to roughen the surface 13 so as to enhance its bond to mastic material 14 as will be seen as the description proceeds.

A file back 15 is prepared which is a relatively flat surfaced piece of elongated metal of width substantially equal to the width of the carbide blocks 11. While any metal of substantial rigidity is satisfactory for the back 15 an aluminum or magnesium alloy has been found exceptionally advantageous in the production of hand files prepared in accord with this description inasmuch as the lightness of the metal gives a most excellent balance to the finished file. Where machine files are intended metals amenable to the specific holding application may be selected with no departure from the spirit of this invention. The preference or selection of the backing material 15 should be made in the softer metals since it has been found that they cushion impact most successfully and less breakage in the tungsten carbide blocks 11 has been observed when such backing 15 is used.

Where a hand file is the file sought to be produced the back 15 may be cast although a preferable economy is realized by using a magnesium alloy extruded strip stock. A tang 16 may be simply cut into the end of the back 15 by means of conventional metal cutting saws or in greater quantities by the use of appropriate clamp jigs and milling. In the case of hand files (specifically illustrated) a wooden or plastic handle 17 provided with an axial aperture 18 is made to frictionally engage the tang 16.

To enhance the appearance of the file the back 15 may be chrome pickled in conventional chrome pickling baths prior to any application of mastic material 14.

The tungsten carbide blocks 11 and the metal back 15 are cleaned mechanically and chemically to remove any foreign substance such as greases and oils which might interfere with a mastic bond. Steam cleaning and baths of well-known commercial solvents followed by a water rinse have proved quite satisfactory. Production tests have indicated that steam cleaning alone or carbon tetrachloride baths alone are satisfactory but the combination of cleaning sequence indicated is believed to assure best uniform results.

The blocks 11 and back 15 being cleaned, the blocks 11 are matched and aligned longitudinally with the file faces 12 in contact with a flat level metal surface plate 19. Mastic material 14 is spread upon the flat surfaces 13 of the blocks 11 where the metal back 15 is intended to contact the tungsten carbide blocks 11. Mastic material 14 is also spread upon the face of the back 15 which is intended to be contacted. The mastic material 14 is permitted to air dry until the material is tacky to the touch, but is not withdrawn by the fingers. Then the back 15 is forced into contact alignably with the tungsten carbide segments or blocks 11. Pressure is applied to the union of back 15 and blocks 11 which squeezes out excess mastic material 14. The pressure applied should be moderate and care must be taken to avoid breaking the teeth 12 of the file segments 11.

While clamped together with the mastic material 14 sandwiched between the back 15 and the blocks 11 the mastic 14 is permitted to cure. In this manner the level of the teeth 12 in the blocks 11 is maintained and the mastic material 14 compensates for any differences in the thickness of the blocks 11 or any surface irregularities between the smooth face of the blocks 11 and the back 15.

The mastic material 14 is a resin composition achieving an excellent bond between metal and tungsten carbide with only a moderate curing temperature not to exceed 350 degrees Fahrenheit. Examples of satisfactory mastic compositions are materials in the resin and synthetic rubber fields, and more specifically the thermosetting resins having the following physical properties: the bond strength, after curing, should exceed 700 pounds per square inch. In some instances the bond strength may be somewhat beneath 700 pounds per square inch depending upon the strength required in the ultimate application. The curing time is properly a function of the particular resin employed, temperature, and pressure, and will thus vary widely with the selected resin and the particular production schedule or procedure. The resin, once set, must remain substantially shrink-free upon completion of curing, especially since the thickness of the cured mastic will vary along the length and width of the file.

In some instances curing may be accelerated with temperatures up to 375 degrees Fahrenheit. In other instances where it is not production-advisable to accelerate curing, curing may be achieved at room temperatures over longer periods of time, as, for example, in the epoxy resins.

Among resins employed are members of the epoxy, polyester, phenolic and urea classes that upon curing exhibit excellent adhesion for metal and are substantially shrink-free. Certain synthetic latex materials, notably buna-S, are operable whenever the bond strengths are satisfactory. Greater impact resistance at the sacrifice of bond strength characterizes these latter materials.

The epoxy resins produce excellent mastic materials since they possess excellent impact resistance and good dimensional stability. The mastic 14 may be formulated with conventional fillers, extenders, bulking agents, and pigments, as desired.

The mastic material 14 selected, aside from its bonding excellence, should possess shock dampening qualities of its own which adjusts to variations in the coefficients of expansion between the back 15 and blocks 11 and, by virtue of its dimensional stability, assists in cushioning such stresses as are developed internally and upon impact.

Upon completion of the bond by the adherence of the mastic 14 to the blocks 11 and back 15 the strength of the bond permits finish grinding of the file faces 12 while the blocks 11 are in place upon the back 15. Free hand grinding and sharpening assures a completed file having extremely accurate tooth alignment. A file such as the file illustrated in FIG. 4 is thus provided which can be used in metal finishing operations at relatively high speed and which will outlive many times conventional metal files in all applications where metal files have been heretofore employed.

When regrinding becomes necessary the mastic bond 14 need not be disturbed. Where the blocks 11 or teeth 12 have been damaged the blocks 11 are simply stripped from the back 15 by subjecting the file to temperatures above those where the mastic commences to break down. The temperature normally utilized ranges between 400 degrees Fahrenheit and the softening point of the metal back 15. The tungsten carbide blocks 11 are unharmed at such temperatures and are simply removed from the back 15 and the residual mastic 14 scraped or sanded from the joining surfaces. New blocks 11 are applied.

While the tungsten carbide file described has not been specifically illustrated to include file faces upon the edges of the tungsten carbide segments or blocks 11, it will be understood that such files made from tungsten carbide blocks are intended to be included in the description as falling within the spirit of the invention.

Further, the term "tungsten carbide" wherever used herein is intended to include a range of materials having machine tool application paralleling the tungsten carbide.

Having thus described a new and unique article of manufacture and a method for its production, we claim:

A method for manufacturing carbide files including: forming a metal back; grinding file faces in a plurality of rectangular tungsten carbide blocks of substantially equal thicknesses and widths; sintering said blocks; placing said blocks in end to end relationship with said ground file faces upon a flat surface; spreading a thickness of mastic material upon the unground upturned sides of said blocks; lightly forcing said metal back into engagement with the said unground upturned sides of said blocks sandwiching said mastic between said blocks and said back, thereby compensating with mastic thickness for irregularities between said block and said back; curing said mastic material; and finish grinding said file faces while bonded to said back.

References Cited in the file of this patent

UNITED STATES PATENTS

| 129,103 | Cliffton | July 16, 1872 |
| 771,739 | Murphy | Oct. 14, 1904 |
| 1,785,836 | Lehto | Dec. 23, 1930 |
| 2,308,624 | Pouech | Jan. 19, 1943 |

FOREIGN PATENTS

| 127,492 | Australia | Apr. 29, 1948 |
| 249,788 | Germany | Dec. 10, 1910 |
| 626,445 | Great Britain | July 15, 1949 |

OTHER REFERENCES

"Kennametal Files," page 66 of Catalog No. 49, issued in May 1949 by Kennametal Inc., Latrobe, Pa.